Patented Oct. 1, 1940

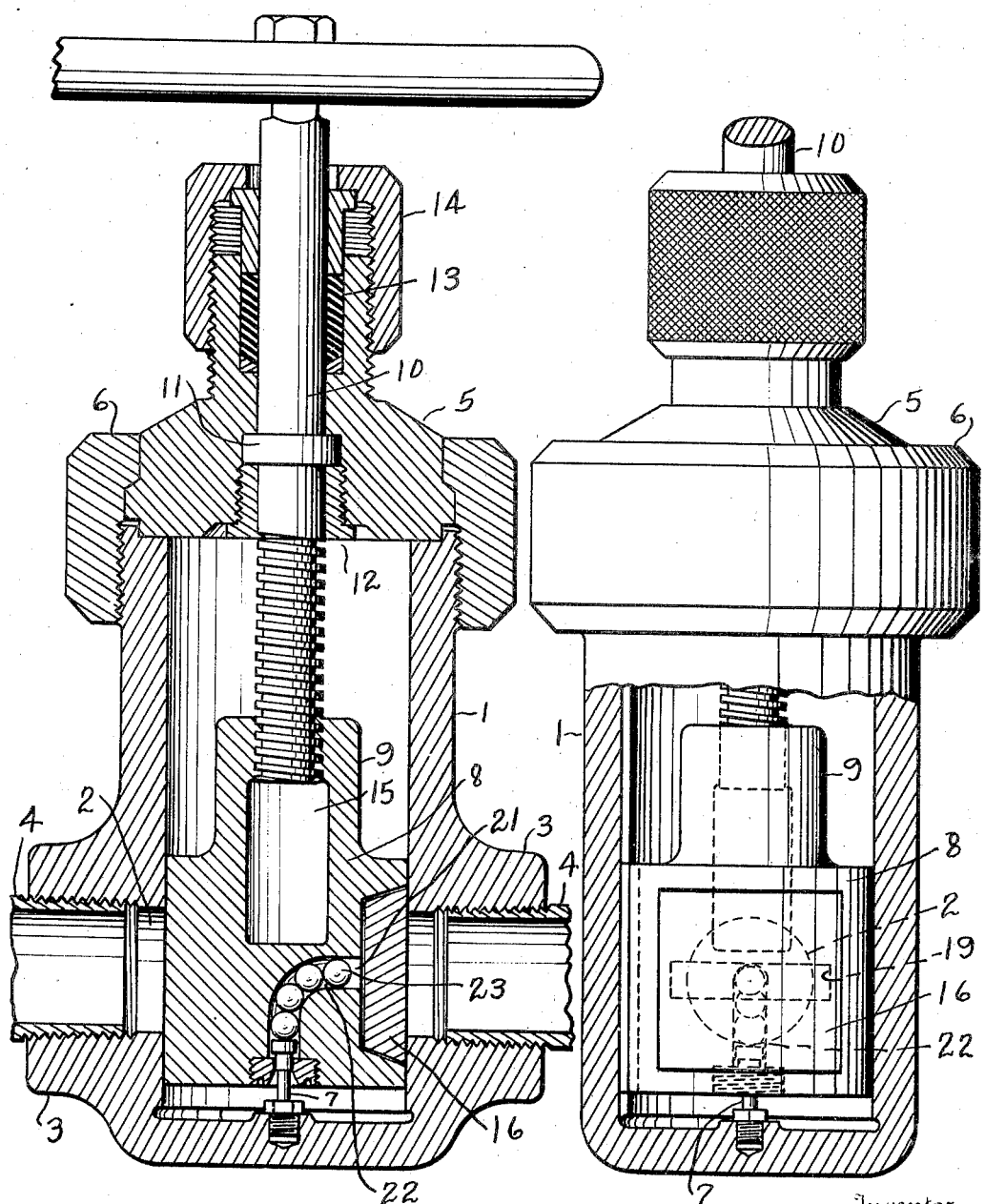

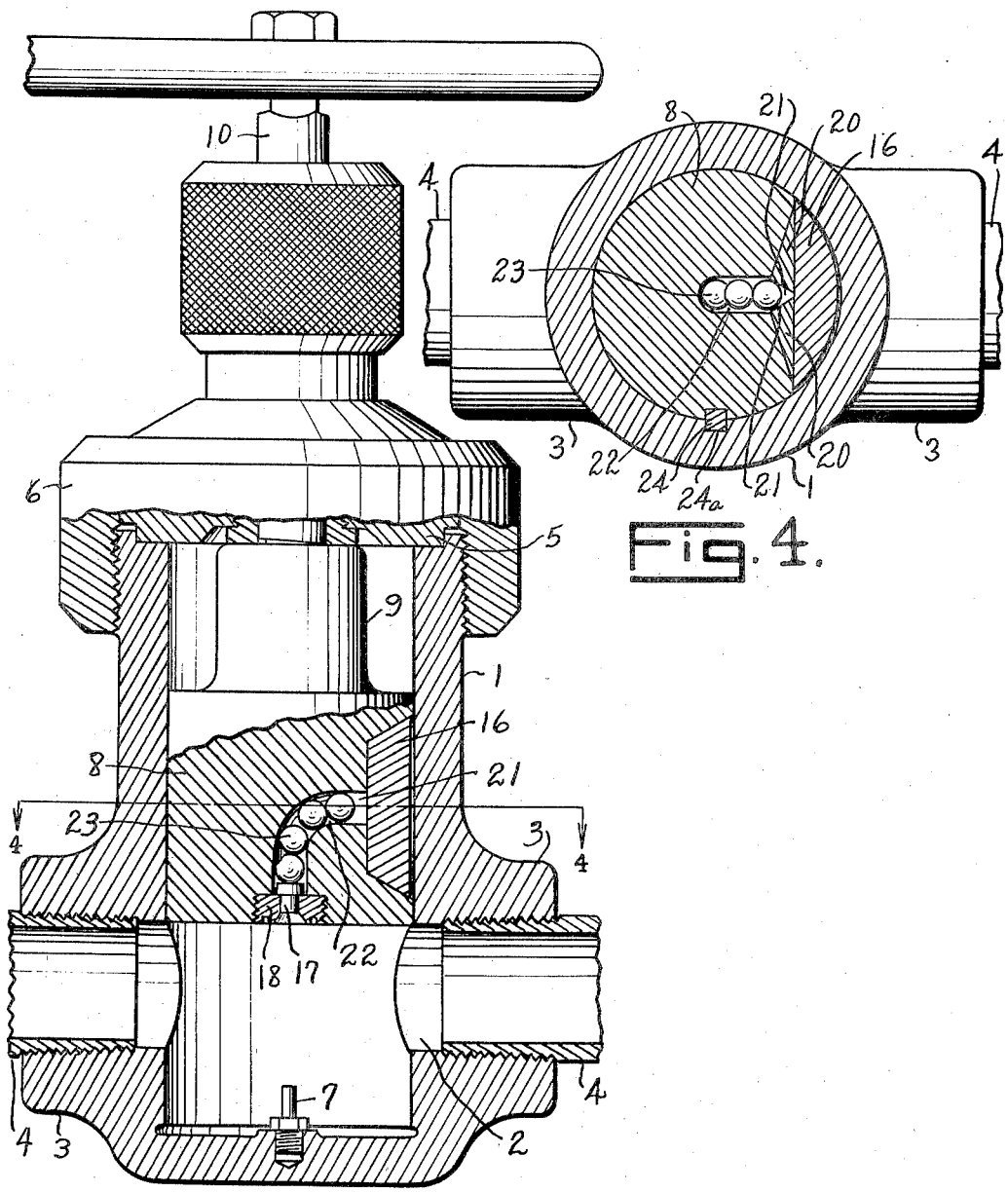

2,216,129

UNITED STATES PATENT OFFICE 2,216,129

VALVE ASSEMBLY

Arthur J. Penick and Kirby T. Penick, Houston, Tex.

Application December 8, 1938, Serial No. 244,533

6 Claims. (Cl. 251—68)

This invention relates to a valve assembly.

The invention embodies certain improvements over that type of construction disclosed in our co-pending applications Serial No. 186,625, filed January 4, 1938, Serial No. 235,387, filed October 17, 1938 and Serial No. 239,830, filed November 10, 1938.

The invention has particular relation to an assembly embodying a valve casing having a fluid passageway therethrough, a valve in the casing movable into one position to open the passageway and into another position to close the passageway with novel means embodying wedges, and wedge actuating means whereby a fluid tight seal between the valve and casing around the passageway will be produced when the valve is in closed position.

Another object of the invention is to provide novel mechanically actuated means embodied in the valve itself whereby a fluid tight relation between the valve and casing will be effected automatically when the valve is in closed position.

More specifically, the invention embodies a valve having a movable side section with means embodying wedges and wedge actuating means for automatically applying force against the inner side of the movable side section, when the valve is in closed position, to, in effect, increase the outside diameter of the valve to thereby cause it to fit more closely about the passageway through the casing to form fluid tight seals about the passageway.

With the above and other objects in view, the invention has particular relation to certain novel features of construction, operation and arrangement of parts, an example of which is given in this specification and illustrated in the accompanying drawings, wherein:

Figure 1 shows a sectional view of the valve in closed position.

Figure 2 shows a side view partly in section thereof, taken at right angles to the view shown in Figure 1.

Figure 3 shows a side view, partly in section, showing the valve in open position, and Figure 4 shows a cross sectional view taken on the line 4—4 of Figure 3.

Referring now more particularly to the drawings, wherein like numerals of reference designate the same parts in each of the figures, the numeral 1 designates the valve casing which is preferably of cylindrical shape in cross section as more clearly shown in Figure 4 and which has a passageway 2 for fluid therethrough. Around the passageway on each side are the tubular connections 3, 3 for connecting the casing into adjacent sections 4 of a flow line. On one end of the valve casing there is a bonnet 5 which may be secured thereon in any preferred manner but which is shown secured on the casing by the clamp nut 6. The opposite end of the casing is closed and is provided with an inside stop 7.

Fitted into the casing there is a cylindrical valve 8 having, at one end, a reduced neck 9. The valve may be actuated into one position clear of the passageway 2 as shown in Figure 3 to open the valve and may be actuated to another position as shown in Figures 1 and 2 to close said passageway. The valve may be actuated into either of said positions by a rotatable stem 10 whose inner end has a coarsely threaded connection with the valve and whose outer end has a swiveling connection with the bonnet. This swivelling connection is provided by means of the annular rib 11 on the stem which is seated in the bonnet and is retained therein by gland 12 which is screwed into the inner side of the bonnet around the stem as shown in Figure 1. The stem extends axially through the bonnet and beyond the rib 11 the stem is surrounded by the stuffing box 13 which is retained in place by a flange nut 14 screwed onto the outer end of the bonnet. The inner threaded end of the stem 10 is threaded into a deep socket 15 in the neck 9 and which extends on into the valve 8.

Countersunk into one side of the valve there is a movable section 16 which forms a part of the valve proper. The outer face of the movable section 16 is arcuate to conform to the shape of the inside of the valve casing 1.

Mounted in the valve opposite the stop 7 there is a plunger 17 which is maintained against detachment by the surrounding gland 18 which is screwed into the valve.

In the main body of the valve adjacent the inner side of the movable section 16, there is a transverse groove 19 forming wedge seats. The bottoms of these seats diverge outwardly as shown in Figure 4 and in the respective wedge seats are the wedges 20, 20 whose adjacent ends have the diverging faces 21, 21.

In the main body of the valve there is a channel 22 therethrough which is filled with the spherical bodies 23, preferably formed of metal. One end ball of the series fits between the diverging faces 21 and the other end ball of the series rests on the plunger 17. When the valve is in open position as shown in Figure 3, the pressure of the series of balls in the bore or channel 22 will be released from the faces 21 of the wedges and the pressure of the wedges against the movable section 16 will be released and said section will be permitted to relax and the valve may be readily moved to closed position to carry the section 16 into alignment with the passageway 2 as shown in Figure 1. Just before the valve reaches its final closed position, the outer end of the plunger 17 will contact against the stop 7 and upon final movement of the valve to closed position, the plunger 17 will act against the series of balls and force will be transmitted through the series of balls against the diverging faces 21 and said wedges will be moved outwardly or apart, acting with wedge like effect between the main body of the valve and the sections 16 to move said section outwardly into close contact with the wall or casing around the passageway on that side of the casing. This will operate by reaction to force the valve 8 in the opposite direction and closely against the opposite side of the casing around the passageway 2. It is to be noted that the valve is splined in the casing against rotation by the spline 24, a longitudinal keyway 24a being provided in the valve to receive this spline, and the spline has sufficient clearance in the keyway so that when the section 16 is moved outwardly into close fitting relation with the valve casing around the passageway 2 the valve will have sufficient movement in the opposite direction to form a close fitting seal around the passageway on the opposite side of the valve casing.

Upon initial movement of the valve toward open position the pressure on the series of balls will be relieved and the pressure of the ball between the faces 21 of the wedges will be relieved permitting the wedges to at once move inwardly toward each other thus relieving the pressure of the section 16 against the inside wall of the casing to the end that the valve may be moved to open position with little friction with the walls of the casing.

What we claim is:

1. A valve assembly comprising a casing having a passageway therethrough, a valve in the casing movable to one position to open the passageway and to another position to close the passageway, said valve having an independent side section positioned to surround the passageway when the valve is in closed position, wedges effective to wedge between the side section and the valve to force said section closely against the casing wall around the passage-way when the valve is moved to closed position and means arranged to wedge between said wedges to effect their wedging action.

2. A valve assembly comprising a casing having a passageway therethrough, a valve in the casing movable to one position to open the passageway and to another position to close the passageway, said valve having an independent side section positioned to surround the passageway when the valve is closed, a pair of oppositely disposed wedges between the valve and the side section and means including a series of spherical units effective to actuate the wedges apart, when the valve is in closed position, to force said side section closely against the casing wall around the passageway when the valve is moved to closed position.

3. A valve assembly comprising a valve casing having a passageway for fluid therethrough, a valve in the casing movable to one position to open the passageway and to another position to close the passageway, said valve having an independent side section positioned to surround the passageway when the valve is closed, said valve having wedge seats and oppositely disposed wedges in the seats between the valve and said side section, the adjacent ends of the wedges having diverging faces, said valve having a bore and a series of balls in the bore, a plunger in the valve operative against said series, means in the casing arranged to actuate the plunger to force a ball of said series between said diverging faces, whereby the section will be forced closely against the casing wall around the passageway when the valve is moved to closed position.

4. A valve assembly comprising a valve casing having a passageway for fluid therethrough, a valve in the casing movable to one position to open the passageway and to another position to close the passageway, said valve having a movable portion, wedge means operative against said movable portion, said valve having a single bore and a series of mobile units in the bore operative against said wedge means, upon movement of the valve to closed position, whereby the movable portion will be forced into sealing engagement with the opposing wall of the casing.

5. A valve assembly comprising a valve casing having a passageway for fluid therethrough, a valve in the casing movable to one position to open the passageway and to another position to close the passageway, said valve having a movable portion and a single bore, wedge means operative against said movable portion, a series of mobile units in the bore and means operative against said series, when the valve is moved to closed position to effect actuation of the wedge means, through said series, to force said movable portion into sealing engagement with the opposing wall of the casing.

6. A valve assembly comprising a valve casing having a passageway for fluid therethrough, a valve in the casing movable to one position to open the passageway and to another position to close the passageway, said valve having an independent, countersunk side section positioned to surround the passageway when the valve is closed, said valve having wedge seats and oppositely disposed wedges in the seats between the valve and said side section, the adjacent ends of the wedges having diverging faces, said valve having a bore and a series of independent units in the bore, a plunger in the valve operative against said series, means in the casing arranged to actuate the plunger to force a unit of said series between said diverging faces whereby the section will be forced closely against the casing wall around the passageway when the valve is moved to closed position.

ARTHUR J. PENICK.
KIRBY T. PENICK.